(12) United States Patent
Hedman et al.

(10) Patent No.: US 8,960,032 B2
(45) Date of Patent: Feb. 24, 2015

(54) MULTI-CLUTCH TRANSMISSION FOR A MOTOR VEHICLE

(75) Inventors: Anders Hedman, Marstrand (SE); Klas Bergström, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 217 days.

(21) Appl. No.: 13/701,429

(22) PCT Filed: Jun. 2, 2010

(86) PCT No.: PCT/EP2010/003336
§ 371 (c)(1),
(2), (4) Date: Dec. 19, 2012

(87) PCT Pub. No.: WO2011/150947
PCT Pub. Date: Dec. 8, 2011

(65) Prior Publication Data
US 2013/0081492 A1 Apr. 4, 2013

(51) Int. Cl.
*F16H 3/08* (2006.01)
*F16H 3/00* (2006.01)
*F16H 3/091* (2006.01)

(52) U.S. Cl.
CPC .............. *F16H 3/08* (2013.01); *F16H 3/006* (2013.01); *F16H 3/0915* (2013.01); *F16H 2200/0052* (2013.01)
USPC ............................................. 74/330; 74/339

(58) Field of Classification Search
USPC .................................. 74/330, 339
See application file for complete search history.

(56) References Cited

U.S. PATENT DOCUMENTS

| | | | | |
|---|---|---|---|---|
| 4,735,109 A * | 4/1988 | Richards et al. | ................ | 74/745 |
| 4,736,643 A * | 4/1988 | Richards | ........................ | 74/339 |
| 4,876,907 A | 10/1989 | Andersson et al. | | |
| 5,613,289 A * | 3/1997 | Zauner | ...................... | 29/407.08 |
| 6,814,682 B2 * | 11/2004 | Spitale | .......................... | 475/222 |
| 8,752,442 B2 * | 6/2014 | Hedman et al. | ................. | 74/330 |
| 2009/0301243 A1 | 12/2009 | Reisch et al. | | |

FOREIGN PATENT DOCUMENTS

| | | |
|---|---|---|
| DE | 4122628 A1 | 1/1993 |
| DE | 19548622 C1 | 5/1997 |
| DE | 102005005693 A1 | 8/2006 |

OTHER PUBLICATIONS

International Search Report (Dec. 30, 2010) for corresponding International application No. PCT/EP2010/003336.
International Preliminary Report on Patentability (May 30, 2012) for corresponding International application No. PCT/EP2010/003336.

* cited by examiner

*Primary Examiner* — Ha D Ho
(74) *Attorney, Agent, or Firm* — WRB-IP LLP

(57) ABSTRACT

A multi-clutch transmission for a motor vehicle is provided where a central synchronizing unit includes an axially movable synchronizing member that is arranged on and rotationally locked with a countershaft. In actuated states of the central synchronizing unit, the synchronizing member is displaced axially into engagement with mating portions of two gearwheels that are rotatably arranged on the countershaft. The synchronizing member includes an internal and an external cortical friction surface that axially overlap each other, and the mating portions on the two of the gearwheels are mating conical surfaces.

8 Claims, 4 Drawing Sheets

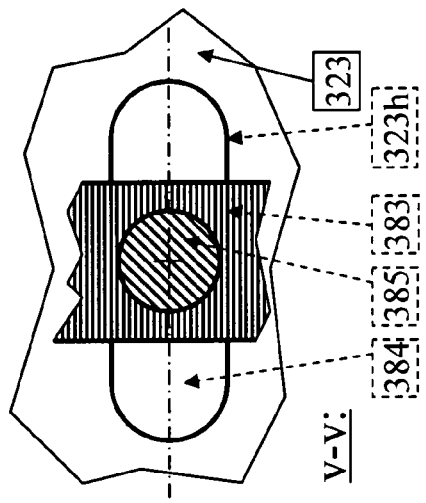
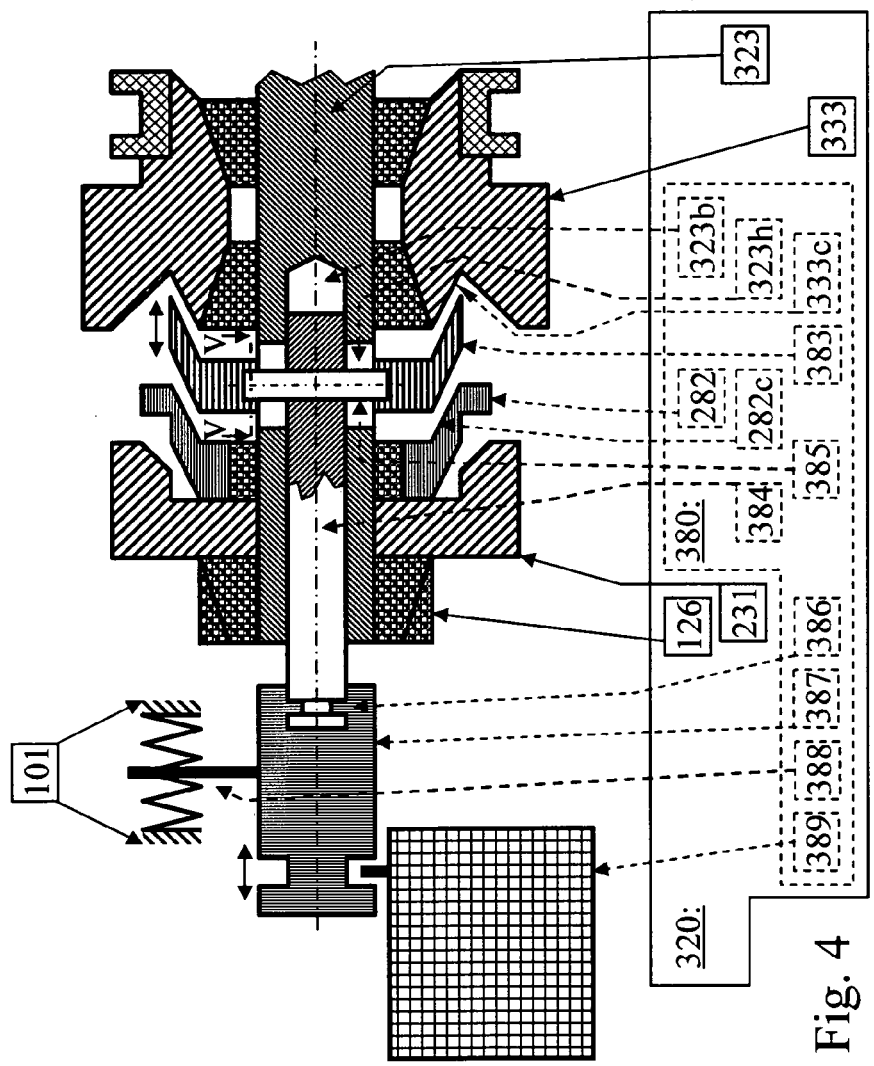
Fig. 5
Fig. 4

MULTI-CLUTCH TRANSMISSION FOR A MOTOR VEHICLE

BACKGROUND AND SUMMARY

The present invention relates to vehicle transmissions, especially for heavy, on- and off-road vehicles, and more particularly to dual- and multi-clutch transmissions with a central synchronizing unit that facilitates the preselection of gears.

Dual clutch transmissions are a cross-breed between conventional stepped transmissions, with power interruption at gear shifts, and powershifting, without power interruption, planetary transmissions. In principle, a dual clutch transmission has two input shafts, each connectable to a friction clutch and to the output of the engine. Functionally, this is equivalent to having two conventional transmissions in parallel. i.e., two parallel sub-transmissions, and using one at a time for power transfer. The sub-transmission that is not used, idling, for the time being, can have a gear engaged and prepared, preselected, for a subsequent shift. This shift is carried out by simultaneously disengaging the friction clutch of the previously used sub-transmission and engaging the friction clutch of the previously idling sub-transmission.

When properly designed, dual clutch transmissions have the potential of providing powershifts at a reasonable production cost and low power losses. This is due to the fact that the rotating parts, i.e., gearwheels, shafts and tooth clutches, are similar to those in conventional stepped transmissions. This, furthermore, enables the use of the same production equipment. So, it makes sense to produce dual clutch transmissions in the same facilities as used for conventional stepped transmissions.

Dual clutch transmissions often have two separate countershafts, one connected to each input shaft. One example is U.S. Pat. No. 4,876,907. These countershafts make the transmission considerably wider than a conventional stepped transmission. That may lead to difficulties in installing the transmission into the vehicle. However, some dual clutch transmission designs have only one countershaft, e.g., as in DE923402 and DE3131156A1. Loose gearwheels are arranged rotatably thereon and can be rotationally connected to each other and to the countershaft by mechanical tooth clutches. In a way, this could be seen as if the second countershaft is arranged coaxial to the first one. The result is a very compact powershiftable dual clutch transmission that is not wider than a corresponding conventional stepped transmission.

Normally, in a dual clutch transmission, gears are preselected in the presently idling sub-transmission by engaging and disengaging tooth clutches. For a smooth and durable operation, this requires that the parts to be engaged by a tooth clutch are synchronized, i.e., that they have fairly equal rotational speed. If not, the clutch teeth would clash, resulting in worn, or broken, teeth and noise. So, different kinds of devices and arrangements are used for synchronizing parts to be engaged. This is also the case for conventional stepped transmissions that have a power interruption at each gear shift. There is, however, one important difference. At a power interruption, the engine speed can be controlled in order to synchronize parts to be engaged. This is a procedure used in automatic mechanically engaged transmissions (AMTs) that are common in heavy trucks and buses. In a dual clutch transmission without power interruption, this is not possible. Instead, some synchronizing devices are required.

A concept, readily known by a person skilled in the art, is to use synchronizers, i.e., every tooth clutch is equipped with synchronizing means, as in US2008/0188342A1. That would imply increased costs and power losses, though.

In FR1445735, hydraulic pumps and valves are used to change the speeds of gearwheels and shafts for synchronizing. This is a costly and complex design. That is also the case for DE10217746A1, having, bulky arrangements of hydraulics and centrifugal weights.

Electric motors could be used for synchronizing the idling sub-transmission. There could be one motor acting on each sub-transmission, or a single motor that can selectively be drivingly connected to any of the sub-transmissions by means of gearwheels and tooth clutches. Two examples are DE19850549A1 and DE19950679A1. As an alternative, a single motor could be kinematically connected to both sub-transmissions via a differential, e.g., as DE19940288C1, EP0845618B1, DE10037134A1, and WO2007/042109A1. However, the peak power required for synchronizing is fairly high. Thus, designs like these would only make sense in hybrid electric powertrains. Otherwise, they would be too bulky, heavy and expensive.

Mechanical frictional clutches can be a powerful, compact and cost-efficient solution for synchronizing in dual clutch transmissions. It can be noted that, in principle, relative to the active sub-transmission, the speed of the idling sub-transmission needs to be either decreased, for preselection before an up-shift, or increased, before a down-shift. This can be embodied by a brake and some kind of a speed-up device, respectively, as in DE3739898A1.

Increasing and decreasing the speed of the idling sub-transmission can be performed by using gearwheels of the lowest and highest gears, respectively.

Practically, the tooth clutches for these gears are each arranged in parallel with a frictional clutch. DE10232836A1 shows a dual clutch transmission where sub-transmissions 14 and 17 have synchronizing clutches; 18 and 20 connect gearwheels 1 and 2 of the lowest gears, 19 and 21 connect gearwheels 9 and 10 of the highest gears. Hence, no additional gearwheels are needed, but four synchronizing clutches, each with control means, are required. That leads to high costs and power losses.

Basically, only two synchronizing clutches are required; one that will make the speed of the first sub-transmission larger than that of the second sub-transmission, and one that will make the speed of the first sub-transmission less than that of the second. This will work when the first sub-transmission is idling and the second is active, as well as when the first sub-transmission is active and the second is idling. Such a device can be referred to as a central synchronizing unit. In WO03/083325A1 this is embodied with two planetary gear trains 30 and 40 that are controlled by a frictional device 50. The design in GB2110324A uses two sets of gearwheels, 33-39-35 and 37-40-36, and frictional clutches, 35 and 38. This will reduce power losses and simplify the control means, but the costs will be large with two planetary gear trains or six gearwheels just for synchronizing.

A central synchronizing unit in a dual clutch transmission can be simplified further. This requires, however, that shifts without power interruption are performed between consecutive gears, only. Furthermore, the speed ratio steps between consecutive gears should be fairly equal. For heavy on- and off road vehicles, in combination with a range section (e.g., as in US2008/0188342A1), this is plausible. In U.S. Pat. No. 4,876,907 a central synchronizing unit 30 makes use of a gearwheel 13 that is used for power transfer. Then, only three additional gearwheels, 32, 33 and 39 are required for the synchronizing function. These gearwheels only need to carry the loads at synchronizing, and can be considerably narrower than the power transferring gearwheels. The central synchronizing unit can, hence, be made very compact, especially in axial extension. In U.S. Pat. No. 5,974,905 it is shown how these additional gearwheels can be used for power transfer, too, giving additional gears. This requires some axial space, though.

The technical journal article Franke, R.: "Das automatische Doppelkupplungsgetriebe fur sorbs oder acht lastfrei, ohne Antriebsunterbrechung und ohne Verspannung schaltbare Gauge", ATZ Automobiltechnische Zeitschrift (ISSN 0001-2785 10810), vol 101 (1999). No. 5, p. 350-357 presents dual clutch transmissions with a central synchronizing unit that requires only two additional gearwheels. Two frictional plate clutches are used as synchronizing clutches. These clutches are arranged axially overlapping, one on each of two parallel shafts. This makes the central synchronizing unit compact in axial direction, but the control means for the plate clutches, on parallel shafts, will become complex and costly.

Thus, a technical problem addressed by the present invention is therefore how to provide synchronizing means that are more i) compact, ii) powerful, and iii) cost-efficient, and iv) have low power losses when not actuated.

Thus, it is desirable to solve the above problem to provide an improved synchronizing means.

According to an aspect of the present invention, a multi-clutch transmission for a motor vehicle is provided with at least one prime mover, said multi-clutch transmission comprises (includes, but is not necessarily limited to) frictional clutches drivingly connected to said prime mover, an output shaft, and a main transmission comprising input shafts connected to said frictional clutches, a countershaft parallel to at least one of said input shafts, gearwheels, tooth clutches, and a central synchronizing unit, where by selective engagement of said frictional clutches and tooth clutches, different speed ratios between said prime mover and said output shaft can be established, and by selective actuation of said central synchronizing unit, engagement of said tooth clutches can be facilitated, said central synchronizing unit comprising an axially movable synchronizing member that is arranged on and rotationally locked with said countershaft, in actuated states of said central synchronizing unit, said synchronizing member is displaced axially into engagement with mating portions of two of said gearwheels that are rotatably arranged on said countershaft. The invention is characterized in that said synchronizing member comprises an internal and an external conical friction surface that are axially overlapping each other, and that said mating portions on said two of said gearwheels are mating conical surfaces.

According to one embodiment of the device according to the invention said synchronizing member is a countershaft synchronizing double cone.

According to another embodiment of the device according to the invention on at least one of said two of said gearwheels, the gear teeth are overlapping said mating conical surface.

According to one embodiment of the device according to the invention on both of said two of said gearwheels, the gear teeth are overlapping said mating conical surface.

According, to a further embodiment of the device according to the invention at least on of said two of said gearwheels is used for power transfer between said prime mover and said output shaft.

According to another embodiment of the device according to the invention said synchronizing member after actuation is recoiled to, and held at, a neutral axial position by a resilient neutral device.

According to one embodiment of the device according to the invention said neutral resilient device is a preloaded spring.

According to a further embodiment of the device according to the invention said synchronizing member is actuated by an actuator via a control rod that is arranged in a coaxial bore of said countershaft.

According to one embodiment of the device according, to the invention said actuator is non-rotating, said control rod is rotating with said counter shaft, and there is an axial connecting device between said actuator and said control rod.

According to another embodiment of the device according to the invention said control rod and said synchronizing member are connected axially by a lateral member through a radial opening in said countershaft.

According to one embodiment of the device according to the invention said radial opening and said lateral member provide a rotational connection between said countershaft and said synchronizing member.

According to a further embodiment of the device according to the invention said lateral member is a synchronizing transfer pin.

BRIEF DESCRIPTION OF THE FIGURES

The present invention will be described in greater detail below with reference to the accompanying figures which, for the purpose of exemplification, show further preferred embodiments of the invention and also the technical background, and in which:

FIG. 4 discloses schematically a close-up of a control of the countershaft synchronizing double cone in a central synchronizing unit according to the invention.

FIG. 5 shows an enlarged view according to arrows v-v in FIG. 4.

DETAILED DESCRIPTION

Figure 1:
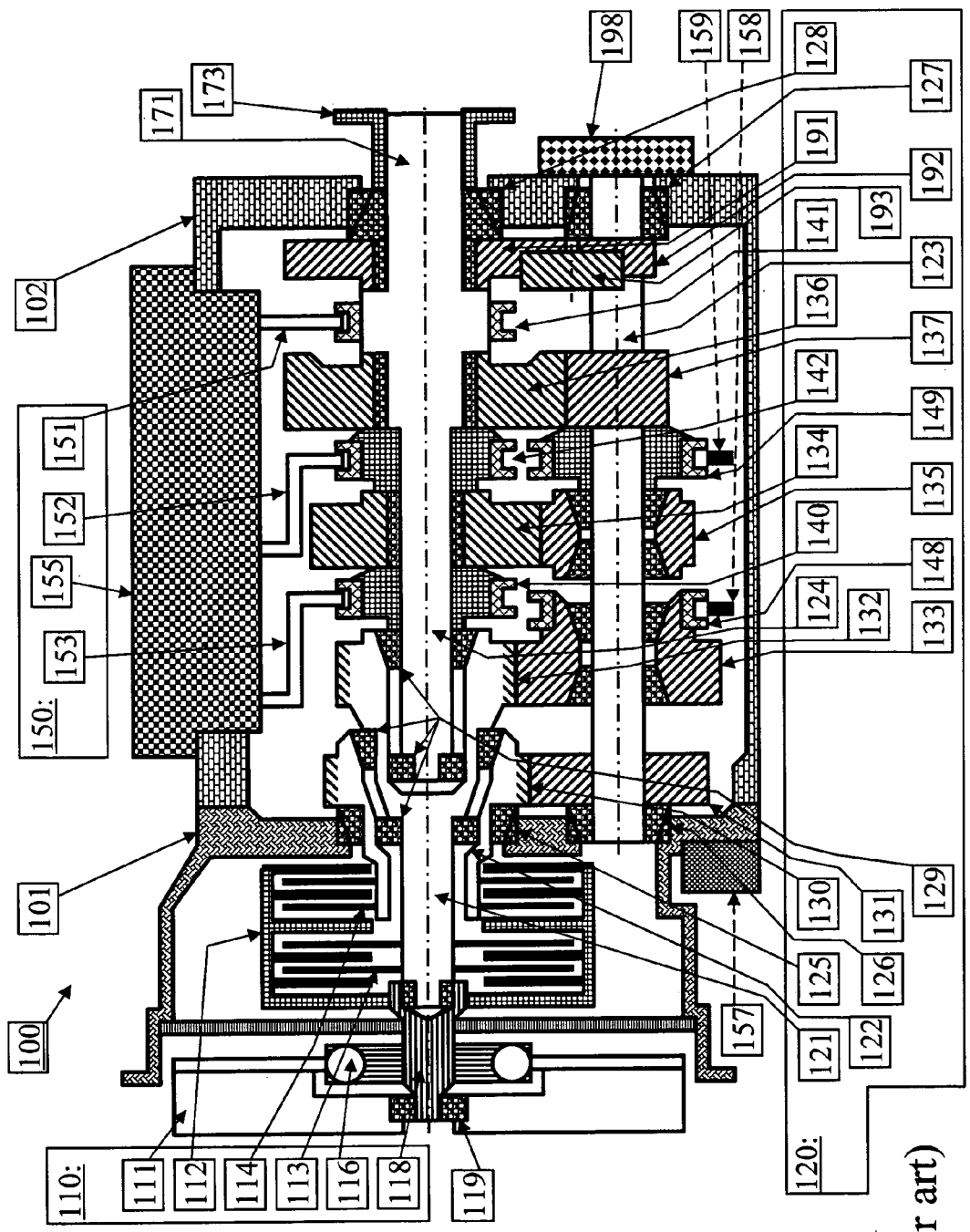
FIG. 1 diagrammatically shows a view of a known dual clutch transmission.

FIG. 1 shows schematically a longitudinal section of a dual clutch transmission 100 similar to the one shown in DE3131156A1. The transmission 100 comprises two housing pans; a clutch housing 101 and a main housing 102, in the clutch housing 101 a dual frictional clutch 110 is arranged, comprising the flywheel 111, a torsional damper 116 bolted thereon, a clutch input shaft 118, and a dual clutch assembly 112 with a first clutch disc set 113 and a second clutch disc set 114.

There is also an actuator device (not shown) to control the dual friction clutch 110. The flywheel 111 is attached to the engine crankshaft (not shown).

A main transmission 120 is arranged inside the main housing 102. There are two input shafts a first input shaft 121 and a second input shaft 122. The first input shaft 121 can be rotationally driven by the first clutch disc set 113. Similarly, the second input shaft 122 can be rotationally driven by the second clutch disc set 114.

First primary gear teeth 132 are integral, with the first input shaft 121. Second primary gear teeth 130 are integral with the second input shaft 122. A main shaft 124 is coaxial with the input shafts 121 and 122. A countershaft 123 is parallel thereto. The second input shaft 122 is suspended in the clutch housing 101 by an input shaft bearing 125. Between the main shaft 124, first input shaft 121 and second input shaft 122, four pilot bearings 129 are arranged. The main shaft 124 is suspended in the main housing by a main shaft bearing 128. Thus, a thorough but not over-constrained suspension of the main and input shafts is achieved.

The main shaft 124 carries three loose gearwheels; the second secondary loose gearwheel 134, the first secondary loose gearwheel 136 and the reverse secondary loose gearwheel 191. The first and reverse secondary loose gearwheels 136 and 191 can be rotationally locked to the main shaft 124 by a first/reverse tooth clutch 141. Moreover, the second secondary loose gearwheel 134 can be rotationally locked to the main shaft 124 by a second tooth clutch 142. Finally, the main shaft 124 can be rotationally locked to the first input shaft 121 by a direct tooth clutch 140.

On the countershaft 123 a second primary gearwheel 131 is rotationally fixed and meshes with the second primary gear teeth 130 of the second input shaft 122. A primary countershaft loose gearwheel 133 meshes with the first primary gear teeth 132 of the first input shaft 121. A secondary countershaft loose gearwheel 135 meshes with the second secondary loose gearwheel 134 on the main shaft 124. Furthermore, a first secondary gearwheel 137, which is integral with the countershaft 123, is meshing with the first secondary loose gearwheel 136 on the main shaft 124. Finally, a reverse secondary gearwheel 192 is integral with the countershaft 123 and drivingly connected with the reverse secondary loose gearwheel 191 via a reverse idler gearwheel 193. The primary countershaft loose gearwheel 133 can selectively be rotationally locked to the secondary countershaft loose gearwheel 135 by a first countershaft tooth clutch 148. The secondary countershaft loose gearwheel 135 can selectively be rotationally locked to the countershaft 123 by a second countershaft tooth clutch 149.

An output shaft 171 is integral with the main shaft 124. A companion flange 173 is rotationally fixed thereon and is the interface to a not shown propeller shaft.

The automatic or semi-automatic gear shift is carried out by a gear-shift control unit 150. This gear-shift control unit 150 comprises a gear-shift control housing 155, a direct shift fork 153, a second shift fork 152 and a first/reverse shift fork 151. The direct shift fork 153 controls the direct tooth clutch 140. The second shift fork 152 controls the second tooth clutch 142, and the first/reverse shift fork 151 controls the first reverse tooth clutch 141.

The gear-shift control unit 150 will not be described, in detail here. Its structural part, the gear-shift control housing 155, may be machined from a cast blank and is bolted to the main housing 102. Therein, microcontrollers, sensors, valves, and actuators may be found. The shift forks 151, 152 and 153 may be carried by shift rods that connect to actuators. Other configurations are possible; any of the shift forks 151, 152 and 153 may or may not be a part of the gear-shift control unit 150. Furthermore, the gear-shift control unit 150 may be composed of different parts that are arranged at different locations of the transmission 100.

The countershaft tooth clutches 148 and 149 are controlled by a first countershaft shift fork 158 and a second countershaft shift fork 159. The shift forks 158 and 159 are actuated via shift rods (not shown) by a countershaft actuator 157.

An optional power take-off drive unit 198 is bolted to the main housing 102 and rotationally connected to the countershaft 123. The power take-off drive unit 198 may drive, e.g., pumps, compressors and electric machines (not shown). It is not shown in detail, but may comprise housing parts, bearings, shafts, clutches and control parts for engagement and disengagement, gearings, and output flanges, as is readily known by a person skilled in the art.

The main transmission 120 has six forward gears where high power transfer to the driven wheels is enabled during shifts between consecutive gears. There are two reverse gears which can be shifted between without interruption of power transfer. The function is described in FIGS. 1 and 2 in DE3131156A1. The tooth clutches 140, 141, 142, 148 and 149 are equipped with synchronizing parts in order to facilitate engagement. As discussed earlier, this increases the costs and power losses. Furthermore, the synchronized tooth clutches 140, 148 and 142,149 are axially overlapping. This limits their radial extension, which limits their synchronizing performance. It would be of advantage if the transmission 100 could be modified to have a central synchronizing unit. Preferably, such a modification should have minimum impact on the appealing features of the transmission 100 in terms of function and size.

Figure 2:
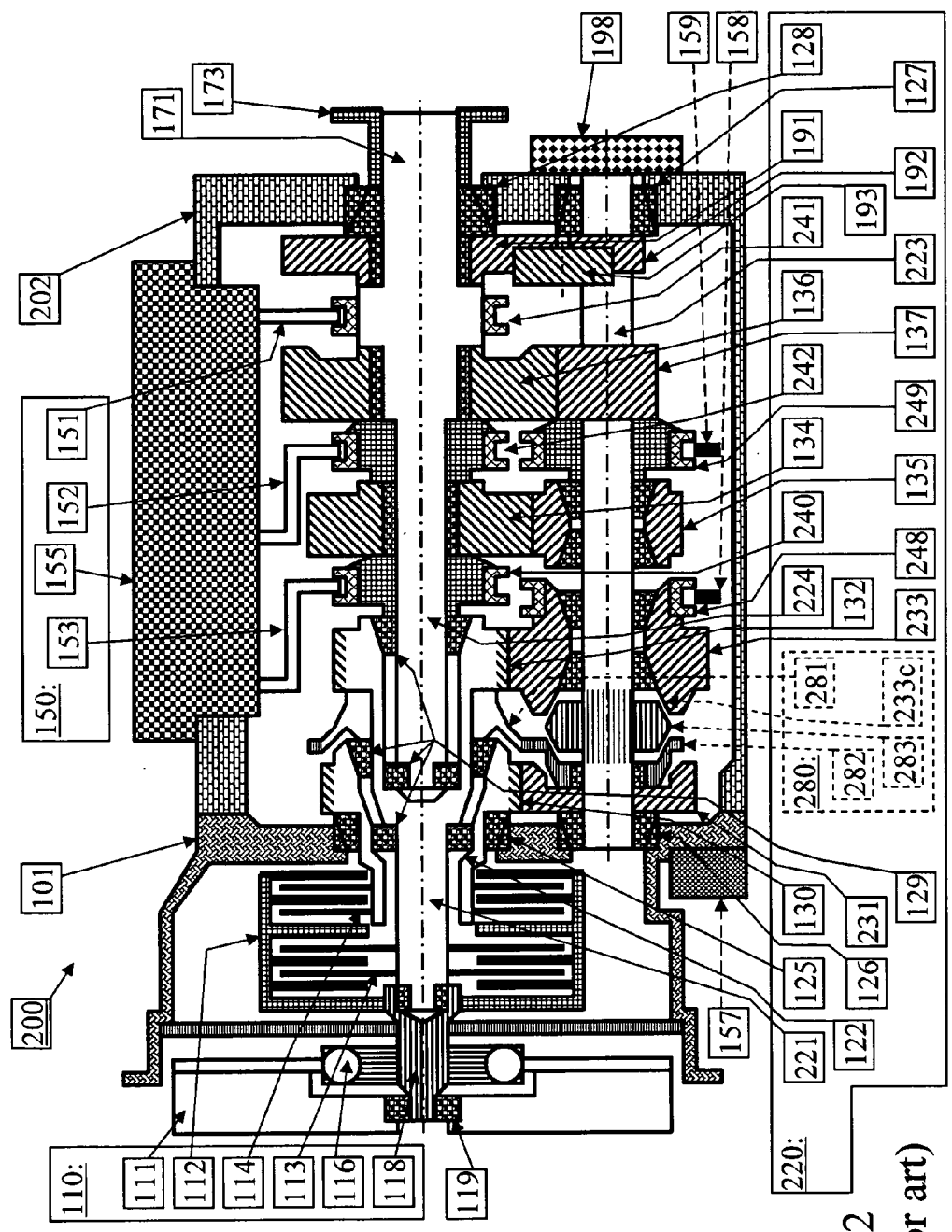
FIG. 2 diagrammatically shows a view of a known dual clutch transmission with a central synchronizing unit.

In FIG. 2, a modified transmission 200 according to known art is shown. Several parts in FIG. 2 are or could be, identical to the corresponding parts in FIG. 1. Those parts are referred to by the same numbers. Corresponding but not identical parts have the same numbers except for the initial digit (2 instead of 1). The modified tooth clutches 240, 241, 242, 248 and 249 do not have synchronizing means. Thereby, the limited radial extension is no longer a disadvantage.

A central synchronizing unit 280 has been added between a modified second primary gearwheel 231, the second input shaft 122, an elongated first input shaft 221, and a modified primary countershaft loose gearwheel 233. The central synchronizing unit 280 comprises an input shaft synchronizing gearwheel 281, a countershaft synchronizing, loose gearwheel 282, a countershaft synchronizing twin cone 283, and an internal conical surface 233*c* on the primary countershaft loose gearwheel 233. The input shaft synchronizing gearwheel 281 is rotationally fixed with the first input shaft 221. The countershaft synchronizing loose gearwheel 282 is rotatably arranged on an elongated countershaft 223. The countershaft synchronizing twin cone 283 is rotationally fixed with, but axially movable on, the countershaft 223.

By axial displacement of the countershaft synchronizing twin cone 283, either of its external conical surfaces will mate with internal conical surfaces on the countershaft synchronizing loose gearwheel 282 or primary countershaft loose gearwheel 233. A frictional torque will then arise that tends to reduce the relative speed between the conical suffices in contact.

The input shaft synchronizing gearwheel 281 has a larger pitch diameter than the second primary gear teeth 130 (on the second input shaft 122), whose pitch diameter in turn is larger than that of the first primary gear teeth 132 of the first input shaft 221. Correspondingly, the pitch diameter is smaller for the countershaft synchronizing loose gearwheel 282 than for the second primary gearwheel 231 and primary countershaft loose gearwheel 233. Thus, by axially displacing the countershaft synchronizing twin cone 283 to the right in FIG. 2, the rotational speed of the primary countershaft loose gearwheel 233 can be made equal to that of the countershaft 223. The rotational speed of the first input shaft. 221 will then be larger than that of the second input shaft 122, due to the smaller pitch diameter of the first primary gear teeth 132. Similarly, axial displacement of the countershaft synchronizing twin cone 283 to the left can make the speeds of the countershaft synchronizing loose gearwheel 282 and countershaft 223 equal. Then, the first input shaft 221 will rotate slower than the second input shaft 122, due to the large diameter of the input shaft synchronizing gearwheel 281.

So, the central synchronizing unit 280 has the potential for adequate function. However, the back-to-back conical surfaces of the countershaft synchronizing twin cone 283 require axial space. The transmission 200 is longer than transmission 100. An alternative could be wet plate clutches, as suggested in e.g., U.S. Pat. No. 4,876,907, DE10232836A1 and GB2110324A. That would most probably not require less axial space, since several clutch plates would be needed for the same synchronizing performance as the conical surfaces in the central synchronizing unit 280. Moreover, the power losses in idling multi-plate clutches are significant.

Figure 3:
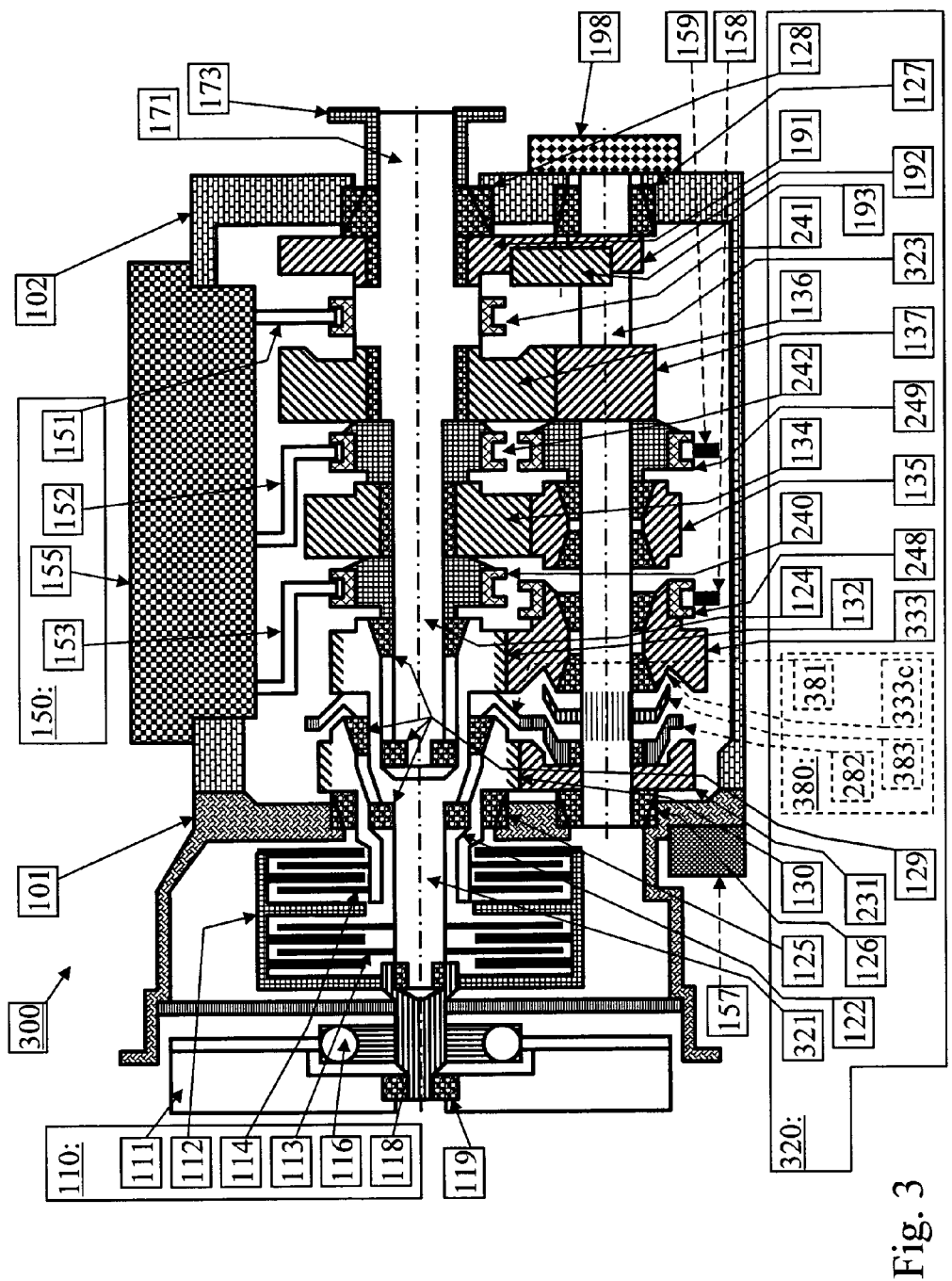
FIG. 3 discloses a dual clutch transmission according to an embodiment of the invention.

FIG. 3 shows a dual clutch transmission 300 with a compact, central synchronizing unit 380 according to the invention. This central synchronizing unit 380 comprises a shortened input shaft synchronizing gearwheel 381, the countershaft synchronizing loose gearwheel 282, a countershaft synchronizing double cone 383, and an external conical surface 333c on the primary countershaft loose gearwheel 333. The countershaft synchronizing double cone 383 has an external conical surface towards the countershaft synchronizing loose gearwheel 282 and an internal conical surface towards the primary countershaft loose gearwheel 333. Thereby, the conical surfaces of the countershaft synchronizing double cone 383 can axially overlap each other, and the external conical surface 333c can overlap the gear teeth of the primary countershaft loose gearwheel 333 and the first primary gear teeth 132. This significantly reduces the axial space requirement of the central synchronizing unit 380.

In an alternative not disclosed embodiment of the invention said external conical surface 333c can be an internal conical surface and the internal conical surface of the double cone 383 towards the primary countershaft loose gearwheel 333 can be an external conical surface. In the corresponding way said countershaft synchronizing double cone 383 can have an internal conical surface towards the countershaft synchronizing loose gearwheel 282 and the said synchronizing loose gearwheel can have an external conical surface.

The control of the countershaft synchronizing twin cone 283 and countershaft synchronizing double cone 383 is not shown in FIGS. 2 and 3. Several possibilities would be apparent for a person skilled in the art.

Hydraulic control could act more or less directly on the parts, but that would require a power-consuming hydraulic pressurized system. A simple shift fork system could act on a disc-shaped radial extension of the countershaft synchronizing twin cone 283 or countershaft synchronizing double cone 383. This would require axial space, though. In U.S. Pat. No. 4,876,907, the control of the corresponding part, 34, is schematically shown as a device 35 along the periphery of countershaft 31. Although this is not easily embodied in a real design, the easy mechanical access to the device 35 at the end of countershaft 31 is appealing.

FIG. 4 shows schematically a close-up of an embodiment according to the invention of the control of the countershaft synchronizing double cone 383 in the central synchronizing unit 380. FIG. 5 shows an enlarged view according to arrows v-v in FIG. 4. The countershaft 323 has a coaxial bore 323b in its left end and, in addition, an oval-shaped hole 323h radially inside the countershaft synchronizing double cone 383. A synchronizing control rod 384 is slidingly arranged in the coaxial bore 323b. A synchronizing transfer pin 385 is arranged in the oval-shaped hole 323h and is connecting the countershaft synchronizing double cone 383 and synchronizing control rod 384. Thus, an axial motion of the synchronizer control rod 384 will give the same axial motion of the countershaft synchronizing double cone 383. Furthermore, the oval-shaped hole 323h provides a rotational connection between the countershaft 323 and synchronizing transfer pin 385. Thereby, the countershaft synchronizing double cone 383 and synchronizing control rod 384 are rotationally locked to the countershaft 323. At the other end of the synchronizing control rod 384, an axial connection 386 couples the axial motion of the synchronizing control rod 384 and a non-rotating control bar 387. After operation of the countershaft synchronizing double cone 383, i.e., displacement towards any of the mating conical surfaces, it is brought back to a neutral position by a resilient neutral device 388. Finally, a synchronizing actuator unit 389 selectably displaces the non-rotating control bar 387.

The axial connection 386 is not shown in detail. The non-rotating control bar 387 may be designed as a shift fork with pads that are arranged in a groove in the synchronizer control rod 384. Another possibility would be axial roller bearings between the non-rotating control bar 387 and synchronizer control rod 384. The non-rotating control bar 387 could be parallel to the synchronizer control rod 384, which could reduce the axial space required.

The resilient neutral device 388 gives the countershaft synchronizing double cone 383 a well-defined neutral position that will give adequate gaps to the mating conical friction surfaces. This will reduce power losses and wear compared to conventional synchronizers, where parts with conical friction surfaces normally may bounce in neutral position. In FIG. 4, the resilient neutral device 388 is schematically shown as two preloaded springs between the non-rotating control bar 387 and transmission housing 101. Other configurations are plausible, e.g. between the countershaft 323 and synchronizing control rod 384 or double cone 383.

So, it can be concluded that the central synchronizing unit 380 is i) compact, in axial direction, due to parts that axially overlap gear teeth, as well as radial. The conical friction surfaces are of similar size as in conventional synchronizers, which makes them ii) powerful. There are few and fairly simple parts, which will iii) keep the costs down. The low number of friction surfaces and a well-defined neutral position will result in iv) low power losses. Hence, the central synchronizing unit 380 can potentially fulfill the scope of the invention.

The countershaft synchronizing double cone 383 along with the use of power transmission gearwheels 132 and 333 for synchronizing purposes may be regarded as key elements in the invention. They provide the potential for a compact and cost-efficient solution.

In an alternative embodiment according to the invention the countershaft synchronizing double cone 383 has a disc-shaped radial extension that is actuated by a shift-fork system similar to tooth clutches.

in a further embodiment according to the invention the countershaft synchronizing double cone 383 is actuated by rotating actuators that are controlled by fluid pressure and arranged on the countershaft 323.

In a preferred embodiment the countershaft synchronizing double cone 383 is ax all locked to the synchronizing control rod 384 that is arranged in the coaxial bore 323h of the countershaft 323. The synchronizing control rod 384 is accessed at one end of the countershaft 323.

In another preferred embodiment, the synchronizing transfer pin 385 locks the countershaft synchronizing double cone 383 to the synchronizing control rod 384. The synchronizing transfer pin 385 is arranged laterally to the countershaft 323.

In a further preferred embodiment, the synchronizing transfer pin 385 can slide axially in the lateral oval-shaped hole 323h of the countershaft 323. Moreover, the oval-shaped hole 323h and synchronizing transfer pin 385 provide a rotational lock between the countershaft 323 and countershaft synchronizing double cone 383.

In a particularly preferred embodiment, the rotating synchronizing control rod 384 is actuated by a non-rotating synchronizing actuator unit 389, and there is an axial connection 386 in the kinematic chain between these parts. The synchronizing actuator unit 389 may be arranged coaxially with or substantially parallel to the countershaft 323.

In a specially preferred embodiment, the countershaft synchronizing double cone 383 after actuation is recoiled to, and held at, a neutral axial position by the resilient, neutral device 388. The resilient neutral device 388 may act between the transmission housing and synchronizing actuator unit 389. It may also act between the countershaft 323 and countershaft synchronizing double cone 383, synchronizing transfer pin 385 or synchronizing control rod 384.

Friction material, e.g., organic, carbon-based, brass, molybdenum or sintered bronze, may be arranged on any of the mating conical friction surfaces. There may be advantages with having it on both conical surfaces of the countershaft synchronizing double cone 383.

Thereby, the friction material is applied on one part, only, which may facilitate at the production and handling of the components. The friction material may be attached to a carrying structure in any of several ways, e.g., bonding, welding, sintering and plasma spraying, as would be known to a person skilled in the art. The countershaft synchronizing double cone 383 may be composed of different parts that are fixed to each other.

The invention has been described with a certain degree of particularity. However, several variations and modifications are possible within what is covered by the claims, as will be apparent to persons skilled in the art. For instance, the main transmission 320 could be combined with a range section, as in US200810188342A1 and U.S. Pat. No. 6,958,028B2.

The main transmission 320 could be substituted by any other dual clutch transmission with a countershaft, e.g., as in U.S. Pat. No. 4,876,907. Other arrangements and locations of friction clutches are possible, e.g., as in U.S. Pat. No. 5,347,879 or U.S. Pat. No. 4,777,837.

Moreover, designs with three friction clutches, "triple clutch transmissions", or more, e.g., DE4226577C1, US2008/0190228A1 or US200910036247A1 could be included. Powershifting transmissions with more than one friction clutch are referred to as multi-clutch transmissions.

The invention should not be deemed to be limited to the embodiments described above, but rather a number of further variants and modifications are conceivable within the scope of the following patent claims.

The invention claimed is:

1. Multi-clutch transmission for motor vehicle with at least one prime mover, the multi-clutch transmission comprising frictional clutches drivingly connected to the prime mover, an output shaft, and a main transmission comprising input shafts connected to the frictional clutches, a countershaft parallel to at least one of the input shafts, gearwheels, tooth clutches, and a central synchronizing unit, where by selective engagement of the frictional clutches and tooth clutches, different speed ratios between the prime mover and the output shaft can be established, and by selective actuation of the central synchronizing unit, engagement of the tooth clutches can be facilitated, the central synchronizing unit comprising an axially moveable synchronizing member that is arranged on and rotationally locked with the countershaft, in actuated states of the central synchronizing unit, the synchronizing member is displaced axially into engagement with mating portions of two of the gearwheels that are rotatably arranged on the countershaft, wherein the synchronizing member comprises an internal and an external conical friction surface that axially overlap each other, and the mating portions on the two of the gearwheels are mating conical surfaces, where on both of the two of the gearwheels, gear teeth of the two of the gearwheels axially overlap the mating conical surface, and where the synchronizing, member is actuated by an actuator via a control rod that is arranged in a coaxial bore of the countershaft and the actuator is non-rotating, the control rod rotates with the countershaft, and there is an axial connecting device between the actuator and the control rod.

2. Multi-clutch transmission as in claim 1, wherein the synchronizing member is a countershaft synchronizing double cone.

3. Multi-clutch transmission as in claim 1, wherein at least one of the two of the gearwheels is used for power transfer between the prime mover and the output shaft.

4. Multi-clutch transmission as in claim 1, wherein the synchronizing, member after actuation is recoiled to, and held at, a neutral axial position by a resilient neutral device.

5. Multi-clutch transmission as in claim 4, wherein the neutral resilient device comprises a preloaded spring.

6. Multi-clutch transmission as in claim 1, wherein the control rod and the synchronizing member are connected axially by a lateral member through a radial opening in the countershaft.

7. Multi-clutch transmission as in claim 5, wherein the radial opening and the lateral member provide a rotational connection between the countershaft and the synchronizing member.

8. Multi-clutch transmission as in claim 7, wherein the lateral member is a synchronizing transfer pin.

\* \* \* \* \*